United States Patent [19]

Holland et al.

[11] 4,001,764

[45] Jan. 4, 1977

[54] ACOUSTIC METHOD FOR DETECTING LEAKS FROM SUBMERGED PIPELINES

[75] Inventors: Warren E. Holland; George R. Burrell, both of Houston, Tex.

[73] Assignee: Exxon Production Research Company, Houston, Tex.

[22] Filed: June 17, 1975

[21] Appl. No.: 587,784

Related U.S. Application Data

[63] Continuation-in-part of Ser. No. 479,398, June 14, 1974, abandoned.

[52] U.S. Cl. .............................. 340/3 R; 340/3 T; 73/40.5 A; 73/170 A
[51] Int. Cl.² ......................................... G01S 9/66
[58] Field of Search ....... 73/40.5 R, 40.5 A, 170 A; 340/3 R, 3 F, 3 T, 8 FT

[56] References Cited

UNITED STATES PATENTS 3,517,400   6/1970   Hemphill .................... 340/8 FT

FOREIGN PATENTS OR APPLICATIONS 1,315,651   5/1973   United Kingdom ............... 340/3 T

OTHER PUBLICATIONS

Edgerton, "Sonic Detection of a Fresh Water–Salt Water Interface," *Science*, Dec. 23, 1966, p. 1555.

*Primary Examiner*—Richard A. Farley
*Attorney, Agent, or Firm*—John S. Schneider

[57] ABSTRACT

A method for locating leaks in liquid-transporting submerged pipelines. A sonar device directs acoustic waves along the path of a submerged pipeline and the reflected waves are detected and recorded. The location of escaping liquid is then determined from the recorded reflected acoustic waves, the differences in the reflected acoustic waves resulting from the difference in acoustic impedances between the escaping liquid and seawater. Gas and/or a liquid having a different acoustic impedance from the seawater in or under which the pipeline is located may be introduced into the pipeline to enhance the detection of the liquid being transported through and leaking from the pipeline. Also, sediments stirred up by fluids leaking from a submerged pipeline and, particularly, a buried or partially buried pipeline will cause determinable differences in the recorded reflected acoustic waves. Further, the crater excavated by the escaping fluids will be revealed by the reflected acoustic waves. In addition, a fluid-transporting pipeline may be surveyed along the path of the pipeline with a sonar device and the reflected acoustic waves detected and recorded during normal no-leak conditions. Then the path of the pipeline is again surveyed by a sonar device and the reflected acoustic waves detected and recorded during abnormal or leak conditions. The "no-leak" and "leak" surveys are then compared. Variations in the surveys will indicate escaping fluids and/or a cavity or anomoly in the ocean floor caused by the flow of fluids from the leak and/or the stirred up ocean floor sediments that are dispersed by the flow of fluids from the leak.

29 Claims, 2 Drawing Figures

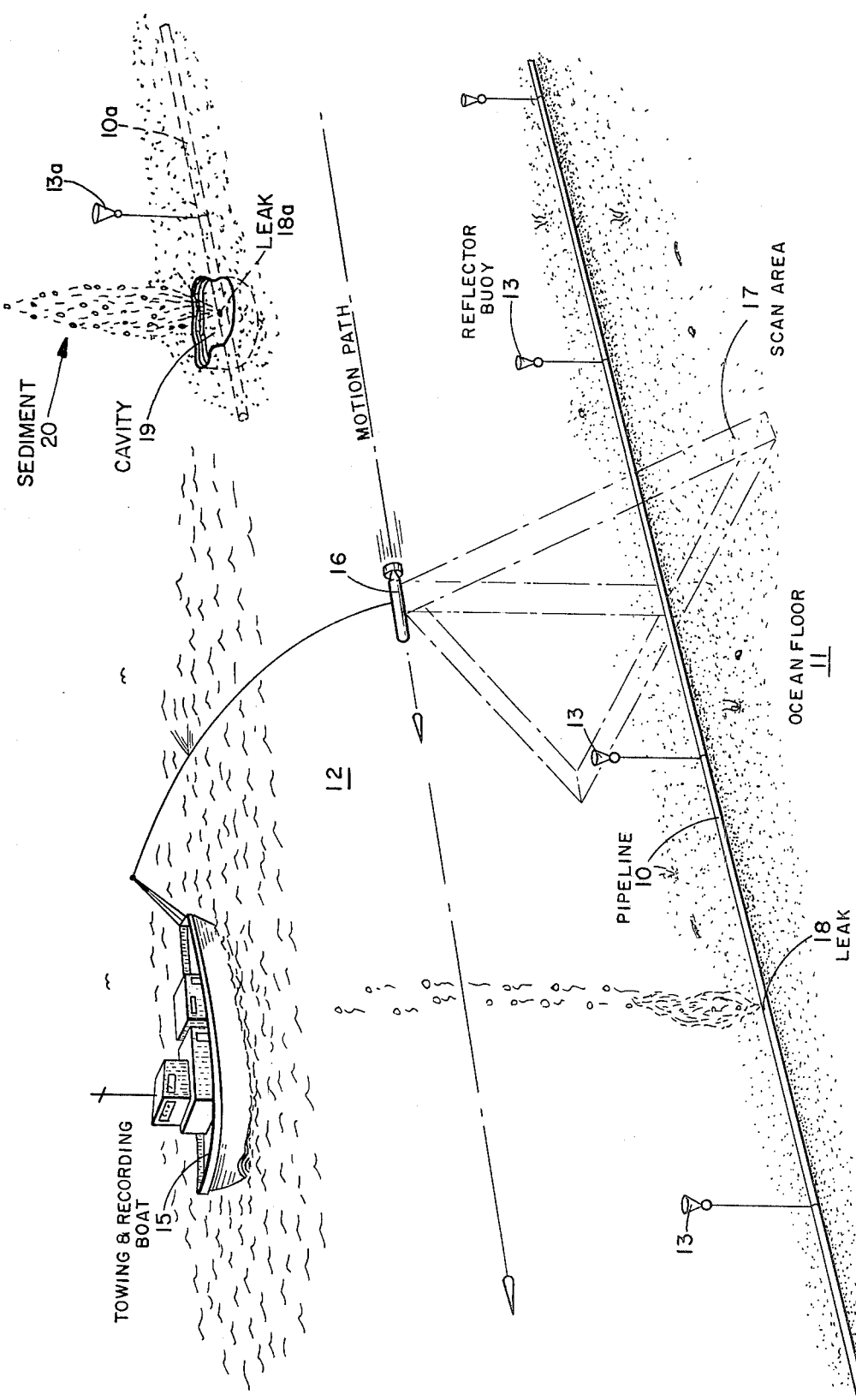

ACOUSTIC METHOD FOR DETECTING LEAKS FROM SUBMERGED PIPELINES

CROSS REFERENCE TO RELATED APPLICATIONS

This application is a continuation-in-part of application Ser. No. 479,398, filed June 14, 1974, by Warren E. Holland et al, now abandoned.

BACKGROUND OF THE INVENTION

Considerable difficulty has been experienced in locating leaks of liquids and, in particular, hydrocarbon liquids such as crude oil, from submerged pipelines, especially such pipelines which lay in open sea or ocean waters. Localization of the leak location is usually accomplished by searching for an oil slick on the water's surface or by seeking some other surface indication of escaping liquids. When some indication of a leak is found divers are employed to search out the exact leak site. Localization in this manner is sometimes impeded because wave action or smallness of the leak prevents surface indication of it from being spotted.

The method of the invention involves the use of sonar to locate leaks of liquids from pipelines. The principles are known and have been applied in the past to show on recordings of reflected acoustic waves the acoustic echos created by hydrocarbon gas escaping from natural seeps in the sea floor or from submerged pipelines. The present invention concerns the detection of liquids leaking from submerged pipelines. The detection function is predicated on the difference in acoustic properties between seawater and the foreign liquid material, such as hydrocarbon liquids (crude oil) escaping from a submerged pipeline. Detection of the leak can be enhanced by introducing into the pipeline a substance or substances, gaseous and/or liquid, which increases the difference in acoustic impedance between seawater and the liquid escaping from the leak. The method of the invention also involves running a "base case" (no-leak conditions) sonar scan of the pipeline to provide comparison of the ocean floor during normal and leak conditions. The comparison of the "no-leak" sonar scan with a later "leak" scan of the pipeline detects the leak location by variations in the scans caused by (1) the leaking fluids themselves (2) a cavity or anomoly formed in the ocean floor by the fluids flowing from the leak in a buried pipeline; and/or (3) sediments that are dispersed by the flow of fluids from the leak. Enhancement of the leak location may be made by restricting flow from the end of the pipeline to cause increased displacement of sediments and increased excavation of a cavity due to increased flow from the leak and/or replacement of the fluids in the pipeline with "nonpolluting" material such as salt water or air and continued displacement of that material through the leak to cause growth of sediment dispersion and increased cavity size. The interface between materials having different acoustic impedances is detectable by known sonar techniques, e.g. side scan sonar, front scan sonar, or direct over-bottom sonar.

SUMMARY OF THE INVENTION

Briefly, the invention concerns a method for detecting leaks of liquid being conducted through a submerged pipeline from such pipeline in which acoustic waves are directed along the path of the submerged pipeline; the reflected acoustic waves are recorded and the location of the leak of, for example, liquid hydrocarbons leaking from the pipeline is determined from such recordings. To enhance the detection technique in the detection of liquid, such as crude oil, leaking from the liquid carrying pipeline, gas such as gaseous hydrocarbons, air, nitrogen or $CO_2$ etc. and/or liquid, such as fresh water, alcohol etc., may be introduced into the pipeline. The introduced gases and/or liquids escape through the leak into the seawater along with the liquid being conducted through the pipeline to provide a greater difference in acoustic impedance between the seawater and the leaking gas and/or liquids than would be provided by the liquid being conducted through the pipeline alone. Gases have sufficiently different acoustic impedance from liquids to enhance detection of the latter. Liquids to be introduced to enhance detection are preselected for acoustic impedances sufficiently different from the liquid being transported to enhance detection of the latter. In addition, sonar reflecting targets or transponders are preferably prelocated along the submerged pipeline to direct the survey path of the sonar along the pipeline. Also, fluids (liquid and/or gas) leaks in a pipeline may be located by comparing "leak" and "no-leak" sonar scans of the pipeline. The flow may be restricted from the end of the pipeline and/or the fluids in the pipeline may be replaced with "non-polluting" material.

FIGS. 1 and 1A illustrate the invention.

DESCRIPTION OF THE PREFERRED EMBODIMENTS

As seen in FIG. 1 a crude oil carrying pipeline 10, laid on the ocean floor 11 beneath a body of seawater 12, has connected to it a series of spaced-apart sonar relector buoys 13. A towing and recording vessel 15 has attached to it a submerged "fish" which is the sonar bearing vehicle 16. The scan area (side scan sonar is illustrated) is indicated at 17 and a leak of liquid and gaseous hydrocarbons from the pipeline is indicated at 18. In practice, the recording vessel 15 tows fish 16 along the path of the pipeline as directed by the sonar reflecting targets or acoustic transponders 13. Transducers in the fish or other sonar bearing vehicle emit short acoustic fan-shaped pulses perpendicular to the ship's track and the pipeline direction. When the scan area passes over leak 18 the recording of the reflected waves will show a difference on the recording because of the difference in acoustic properties between seawater and crude oil escaping from pipeline 10. As an example, the acoustic impedance of crude oil is approximately $1.2 \times 10^6$ kilograms per second meter squared (Kg/sec $m^2$) and the acoustic impedance of seawater is approximately $1.5 \times 10^6$ Kg/sec $m^2$. In that manner leak 18 is located and localized and divers may be sent down to repair the leak.

Gas, such as methane, air, carbon dioxide or nitrogen, etc. may be injected into the pipeline to enhance the detection of the escaping crude oil or other liquid from the pipeline. Each of those gases has a substantially lower acoustic impedance than crude oil and facilitates detection of the crude oil. For example, the acoustic impedance of air is $1.31 \times 10^3$ Kg/sec $m^2$ and that of methane is $0.94 \times 10^3$ Kg/sec $m^2$ and that of carbon dioxide is $1.54 \times 10^3$ Kg/sec $m^2$. All gases have acoustic impedances drastically lower than that of seawater and all will, consequently, be excellent reflectors. The column of bubbles is detectable along with the oil on the recorded reflected waves. Other liquids having acoustic impedances lower than seawater, such as fresh water, ($1.44 \times 10^6$ Kg/sec m$^2$) and ethyl alcohol-95% ($1.01 \times 10^6$ Kg/sec m$^2$), may be introduced into the pipeline instead of or together with the gas to enhance detection of the crude oil leak. Liquids with acoustic impedances higher than that of seawater can be used as effectively as liquids with lower impedances than seawater. In any case the intensity of reflection will depend on the magnitude of the difference of the acoustic impedance. An example of a heavier liquid is 20% sodium chloride solution ($1.84 \times 10^6$ Kg/sec m$^2$ acoustic impedance).

Further, leaking fluids escaping from a pipeline, and particularly a buried pipeline will stir up considerable sediment, which would serve as an acoustic reflector. Also, the escaping fluids will excavate a crater than will be shown on the sonar. Thus, as shown in FIG. 1A a leak 18a in a pipeline 10a (to which is attached sonar reflector buoys 13a) covered or buried by sediments forms a crater or cavity 19 in the sediments and displaces the sediments as indicated at 20. Both the cavity 19 and the dispersed sediments are detectable by the sonar scan. Increased displacement of sediments 20 and increased evacuation of cavity 19 is achievable by restricting flow from the end of pipeline 10 thereby causing increased flow from the leak. Also, increased growth of sediment dispersion and increased cavity size are achievable by replacing the fluid in the pipeline with "nonpolluting" material such as salt water or air and continued displacement through the leak. In addition, leaks of fluid in a pipeline may be located by first running a "base case" survey of the path of the pipeline with a sonar device during normal nonleak conditions. That "base case" sonar scan is later compared with a sonar scan of the path of the pipeline during leak conditions. Variations in the two scans will indicate escaping fluids and/or, with respect to buried pipelines, displacement of sediments and cavities.

The recording may be done on a ship or on a helicopter with the recorder connected to the sonar "fish" equipment.

While the preferred embodiment described herein is directed to locating leaks of crude oil being transmitted through and escaping from submerged pipelines the invention also contemplates locating leaks of liquids other than crude oil which are being transmitted through and escaping from submerged pipelines. Also, as described, the invention contemplates in another preferred embodiment locating leaks of gases, such as methane or natural gas, as well as of liquids.

Changes and modifications may be made in the specific illustrative embodiments of the invention shown and/or described herein without departing from the scope of the invention as defined in the appended claims.

Having fully described the method, objects and advantages of our invention we claim:

1. A method for detecting leaks of liquid being conducted through a submerged pipeline from said pipeline comprising the steps of:
   directing acoustic waves along the path of said pipeline;
   introducing fluid into said liquid-carrying pipeline;
   recording the reflected acoustic waves; and
   determining from said recorded waves the location of leaks of said liquid from said pipeline.

2. A method as recited in claim 1 in which said liquid comprises a hydrocarbon liquid.

3. A method as recited in claim 2 in which said hydrocarbon liquid comprises crude oil.

4. A method as recited in claim 3 in which said fluid comprises gas.

5. A method as recited in claim 4 in which said gas comprises a hydrocarbon gas.

6. A method as recited in claim 4 in which said gas comprises air.

7. A method as recited in claim 4 in which said gas comprises carbon dioxide.

8. A method as recited in claim 4 in which said gas comprises nitrogen.

9. A method as recited in claim 3 in which said fluid comprises another liquid, said other liquid having an acoustic impedance sufficiently different from said crude oil to enhance acoustic detection of said crude oil.

10. A method as recited in claim 9 in which said other liquid is fresh water.

11. A method as recited in claim 9 in which said other liquid is ethyl alcohol.

12. A method as recited in claim 9 in which said other liquid is water having a high salt content.

13. A method as recited in claim 9 in which said other liquid comprises at least a 20% sodium chloride water solution.

14. A method as recited in claim 5 including introducing another liquid into said pipeline, said other liquid having an acoustic impedance sufficiently different from said crude oil to enhance acoustic detection of said crude oil.

15. A method as recited in claim 1 including connecting acoustic reflectors or transponders to said pipeline, said reflectors or transponders directing said acoustic waves along said pipeline.

16. A method for detecting leaks of liquid being conducted through a submerged pipeline from said pipeline comprising the steps of:
   directing acoustic waves along the path of said pipeline;
   recording the reflected acoustic waves;
   introducing gas into said liquid-carrying pipeline;
   introducing another liquid into said pipeline, said other liquid having an acoustic impedance sufficiently different from said liquid being conducted through said pipeline to enhance acoustic detection thereof;
   connecting acoustic reflectors or transponders to said pipeline, said reflectors or transponders directing said acoustic waves along said pipeline; and
   determining from said recorded waves the location of leaks of said liquid being conducted through said pipeline from said pipeline.

17. A method for detecting leaks of fluid being conducted through a submerged pipeline located on the bottom of a body of water from said pipeline comprising the steps of:
   directing acoustic waves along the length of said pipeline;
   recording the reflected acoustic waves; and
   detecting sediments dispersed by said fluids flowing through said leak to determine from said recorded waves the location of said leak in said pipeline.

18. A method as recited in claim 17 in which flow of fluids is restricted from the end of the pipeline downstream of said leak to cause increased displacement of sediments caused by increased flow from said leak.

19. A method as recited in claim 17 including replacing the fluids in said pipeline with "nonpolluting" material and displacing said material through said leak to cause enhanced growth of sediment dispersion.

20. A method for detecting leaks of fluids being conducted through a submerged pipeline located on the bottom of the body of water from said pipeline comprising the steps of:
  directing acoustic waves along the path of said pipeline;
  recording the reflected acoustic waves; and
  detecting a cavity formed in sediments covering said pipeline to determine from said recorded waves the location of leaks of said fluids from said pipeline.

21. A method as recited in claim 20 in which flow of fluids is restricted from the end of the pipeline downstream of said leak to cause increased excavation of said cavity caused by increased flow of fluids from said leak.

22. A method as recited in claim 20 including replacing the fluids in said pipeline with "nonpolluting" material and displacing said material through the leak to cause increased cavity size.

23. A method for detecting leaks of fluids being conducted through a submerged pipeline from said pipeline comprising the steps of:
  directing acoustic waves in a first scan along the path of said pipeline under pipeline nonleak conditions;
  recording the reflected acoustic waves resulting from said first scan;
  directing acoustic waves in a second scan along the path of said pipeline under pipeline leak conditions;
  recording the reflected acoustic waves resulting from said second scan; and
  comparing said first and second scans to determine differences in said scans caused by said leak.

24. A method as recited in claim 23 in which said differences result from fluids leaking from said pipeline.

25. A method as recited in claim 23 in which said differences result from dispersion of sediments by fluids leaking from said pipeline.

26. A method as recited in claim 25 in which said difference result from a cavity formed by dispersion of said sediments.

27. A method as recited in claim 26 including restricting flow of fluids from the end of said pipeline downstream of said leak to increase flow of fluids from said leak and cause increased displacement of said sediments and increased excavation of said cavity.

28. A method as recited in claim 26 including replacing the fluids in said pipeline with "nonpolluting" material and displacing said material through said leak to cause enhanced growth of sediment dispersion and increased cavity size.

29. A method for detecting leaks of fluids being conducted through a submerged pipeline from said pipeline comprising the steps of:
  directing acoustic waves in a first scan along the path of said pipeline under pipeline nonleak conditions;
  recording the reflected acoustic waves resulting from said first scan;
  directing acoustic waves in a second scan along the path of said pipeline under pipeline leaking conditions;
  recording the reflected acoustic waves resulting from said second scan; and
  utilizing variations between reflected acoustic waves recorded under nonleak conditions and reflected acoustic waves recorded under leak conditions to establish location of the pipeline leak.

* * * * *